United States Patent
Gross

(10) Patent No.: US 6,476,148 B1
(45) Date of Patent: Nov. 5, 2002

(54) MATTE-FINISHED POLYMETHACRYLATE FILMS

(75) Inventor: Heinz Gross, Rossdorf (DE)

(73) Assignee: Roehm GmbH & Co. KG, Darmstadt (DE)

(*) Notice: Subject to any disclaimer, the term of this patent is extended or adjusted under 35 U.S.C. 154(b) by 0 days.

(21) Appl. No.: 08/175,672

(22) Filed: Dec. 30, 1993

Related U.S. Application Data

(63) Continuation of application No. 07/923,542, filed on Aug. 3, 1992, now abandoned.

(30) Foreign Application Priority Data

Aug. 3, 1991 (DE) .......................................... 41 25 857

(51) Int. Cl.⁷ .............................................. C08L 33/06
(52) U.S. Cl. ......................... 525/228; 525/227; 525/67; 428/337
(58) Field of Search ................................ 525/222, 228, 525/67; 428/337

(56) References Cited

U.S. PATENT DOCUMENTS

| | | | |
|---|---|---|---|
| 3,655,829 A | | 4/1972 | Ronzoni et al. |
| 3,992,486 A | | 11/1976 | Lang |
| 5,237,004 A | * | 8/1993 | Wu et al. .................... 525/228 |

FOREIGN PATENT DOCUMENTS

| | | | | |
|---|---|---|---|---|
| DE | 1554 781 | | 1/1970 | |
| DE | 1 569 160 | | 7/1970 | |
| DE | 3842 796 | | 6/1990 | |
| EP | 110123 | | 6/1986 | |
| EP | 188 123 | | 7/1986 | |
| EP | 348 115 | | 12/1989 | |
| GB | 2 226 324 | | 6/1990 | |
| GB | 2226324 | * | 6/1990 | .................. 525/227 |

OTHER PUBLICATIONS

CA 113/80072q Morya et al JP 02–28239 Jan. 30, 1990.
CA 112/78782g Shimokawa et al JP 01–234,427 Sep. 19, 1989.
CA 101/172599x JP 59–78,253 May 7, 1984.

* cited by examiner

Primary Examiner—Michael P. Woodward
(74) Attorney, Agent, or Firm—Oblon, Spivak, McClelland, Maier & Neustadt, P.C.

(57) ABSTRACT

The invention relates to a polymethacrylate matte-finish surface and comprised of:

A thermoplastic polymer matrix A, in the amount of 99.9–30 wt. %, comprised of a hard phase (a1) and a tough phase (a2); and Latex particles of a thermoelastic polymer B, in t. of 0.1–70 wt. %, incorporated in the said matrix A, which particles give rise to the matte effect.

Preferably the hard phase (a1) may contain low molecular weight and/or polymer-bound UV-absorbers. The difference between index of refraction of the thermoplastic polymer A and that of the thermoelastic polymer B is at most 0.02. Despite its matte finish, the film has high transparency, is weather resistant, has low incidence of white fracture when buckled or folded, and has impact strength which does not degrade upon cooling or heating. At the same time, the film is effective as a UV filter, to protect substrates which are sensitive to UV irradiation.

22 Claims, No Drawings

MATTE-FINISHED POLYMETHACRYLATE FILMS

This application is a continuation of application Ser. No. 07/923,542 filed on Aug. 3, 1992, now abandoned.

FIELD OF THE INVENTION

The invention relates to matte-finished polymethacrylate (PMA) films.

BACKGROUND OF THE INVENTION

It has been found to be advantageous to protect materials against mechanical wear and the like, and against weathering, by coating the materials with a transparent polymethyl methacrylate (PMMA) film. Such films have a smooth, high gloss surface. However, there are a number of potential applications for which a matte finish of low reflectance is desired.

Matte finishes of thermoplastic plastic substrates, particularly films, are generally produced with the aid of a special matte-finish roll or a rubber-coated roll. In Jap. Pat. 90-28,239, for example, the manufacture of a film or sheet with a matte finish is described. The material comprises vinylidene fluoride resin and methacrylic acid ester resin, and the method comprises extrusion and passage of the extrudate through an embossing roll. A disadvantage of films produced by this method is that when stretched to a minor degree, as occurs for example when the film is wrapped over an edge, or is subjected to pressing in a laminating process (see, e.g., Winnacker-Kuechler, 1982, 4th Ed., Vol. 6, pub. Carl Hanser Verlag, p. 471), the film loses its embossed structure and thus its matte finish.

Matte effects can also be produced on a surface by means of polymer mixtures with a certain heterogeneous mixed phase morphology, possibly stabilized by additional additives. An example of this approach is EP-A 188,123, in which films are described which are comprised of an inherently incompatible polymer mixture of nylon-6 and polypropylene, with the phase morphology stabilized by an ethylene-methacrylate copolymer. Similarly, in EP-A 348,115, polyethylene films are described which contain an ethylehe-methyl methacrylate copolymer as the second phase, with the polyethylene functioning as the disperse phase.

The amounts of the disperse phases which produce the matte effect by their characteristic light dispersion is dependent, in such systems, on the thermodynamic equilibrium in the polymer mixture, and thus is very sensitive to the processing conditions of the film. Accordingly, it is very difficult in a laminating process to establish thermodynamic and therefore thermal conditions which are appropriate for the manufacturing conditions and which at the same time allow the amounts of the disperse phases to be unaffected. However, if these phases are not dimensionally stabile, the result is nonuniform light-dispersive behavior and thereby, at least in some places, loss of the matte effect on the surface.

Certain inorganic pigments, as set forth, e.g., in Jap. Pat. 89-234,427, are dimensionally stabile matte-finish agents (deglossing agents). According to the said patent, a matte surface is produced on polyester films at the time of extrusion, by addition of $CaCO_3$ or $BaSO_4$ together with microspheres of acrylic polymers such as PMMA. However, the high index of refraction of the inorganic pigments results in low transparency of the film, due to high losses of dispersed light.

Another disadvantage is the wear on roll surfaces in the film extrusion process, attributable to the inorganic pigments.

Consequently, a number of applications have proposed crosslinked polymer particles as light-dispersive pigments to produce a matte effect. Thus, Jap. Pat. 84-89,344 describes a weather-resistant protective film having a matte surface comprised of mixtures of polymers of fluorinated ethylenically unsaturated monomers, a crosslinked (meth) acrylate polymer prepared in several stages, and a matte-finish agent comprising crosslinked particles with mean diameter between 1 and 500 microns, comprised of a copolymer of (meth)acrylates, vinyl aromatics, additional $\alpha,\beta$-unsaturated compounds, and crosslinking agent(s). Another example is described in U.S. Pat. No. 3,992,486, wherein translucent plates or coatings having variable gloss can be produced using acrylic resin as the continuous phase which contains particles of crosslinked styrene copolymer(s) which copolymers may also contain methacrylic monomer units, wherewith the particles are uniformly dispersed in the continuous phase. These dispersed particles are produced in polymerization in the presence of polyfunctional unsaturated monomers, wherewith the continuous acrylic resin phase is first present as a dissolved polymer in the monomer mixture. During the polymerization the two polymer phases (acrylic resin and crosslinked styrene copolymer) separate, wherewith due to the poor miscibility of the polymers the styrene copolymer takes the form of small spherical particles with mean diameter between 0.5 and 30 micron.

The light dispersion capabilities of the particles described in the last two mentioned patents depends on the size of the particles and on the difference in index of refraction between the particles and the matrix. The incompatibility between the particles and the matrix is a disadvantage; it leads to substantial degradation of the mechanical properties of the matrix material.

Ger. Pat. 1,554,781 claims a method of manufacturing molded bodies comprised of thermoplastic plastics having a diamond shaped pattern on the surface, said method being characterized in that a mixture of two thermoplastic materials having substantially different flow properties is extruded. Extrudates of this type, when thin, e.g. in the form of films, may display inhomogeneous mechanical behavior, due to flow anomalies during extrusion and thereby variations in thickness of the extrudate.

In a number of practical applications, e.g. protection of articles subject to weathering, it is necessary to coat the articles with a film which provides protection against weathering effects such as the effect of moisture, wind, and sunlight, particularly radiation in the ultraviolet range, and in addition has high impact-strength and a matte-finished surface. The problem presented is to produce a film which has high inherent weather resistance and which protects weather-damageable articles against the above-mentioned weathering influences, and further has high impact strength and a matte-finished surface, so that articles coated with the film have high extensibility and low light reflection.

SUMMARY OF THE INVENTION

Accordingly, it is an object of the invention to provide a composition having high extensibility, and which does not degrade or roll surfaces in a film extrusion process. In addition it is an object of the invention to provide a film which resists weathering (moisture, wind, sunlight), and in a preferred embodiment provides protection from UV radiation. Further, it is an object of the invention to provide a film with a matte-finish surface, which does not degrade upon cooling or heating. It is an additional object of the invention to provide a film having high impact strength, low incidence of white fracture when buckled or folded, and which maintains the matte-finish when stretched (e.g., wrapped over an edge) or subjected to pressing in a laminating process. Furthermore it is an object of the invention to provide a film which has reduced gloss, high light transmission, and which provides diffused light dispersion.

The inventive film is comprised of:

A. A thermoplastic polymer matrix A, in the amount of 30–099.9 wt. %, preferably 50–95%, more preferably 75–85% comprised of:

a1) 10–95 wt. %, preferably 50–90%, more preferably 70–80%, of a coherent hard phase with glass transition temperature >70° C., preferably >85° C., comprised of units as follows:

a11) 80–100 wt. % (of a1), preferably 85–95% of methyl methacrylate; and a12) 0–20 wt. %, preferably 5–15%, of one or more other ethylenically unsaturated, radically polymerizable monomers; and a2) 5–90 wt. %, preferably 10–50%, more preferably 20–30%, of a tough phase distributed in the hard phase and having glass transition temperature <−10° C., preferably <−30° C., comprised of units as follows:

a21) 50–99.5 wt. % (of a2), preferably >80% to 99.5%, more preferably 95–99.5%, of an alkyl acrylate wherein the alkyl group has 1–10 C atoms;

a22) 0.5–5 wt. %, more preferably 0.5 to 1.5%, of a crosslinking monomer and/or graft crosslinking agent, having 2 or more ethylenically unsaturated, radically polymerizable groups; and a23) optionally other ethylenically unsaturated, radically polymerizable monomers;

whereby at least 15 wt. %, preferably at least 20%, of the hard phase (a1) is covalently linked with the tough phase (a2); and B. Bodies to produce the matte-finish effect, in the amount of 0.1–70 wt. %, preferably 5–50%, more preferably 15–25% heterogeneously distributed in the thermoplastic matrix polymer and comprised of a thermoelastic polymer B which is comprised of units as follows:

b1) 50–99.5 wt. % (of B), preferably 90–98% of alkyl methacrylates wherein the alkyl group may be linear, branched or cyclical and has 1–6 C atoms;

b2) 0.5–10 wt. %, preferably 2–10% of a crosslinking monomer having 2 or more ethylenically unsaturated, radically polymerizable groups; and b3) optionally other ethylenically unsaturated, radically polymerizable monomers.

The difference between the index of refraction $n_{D,A}$ of the thermoplastic matrix polymer A and the index of refraction $n_{D,B}$ of the heterogeneously distributed bodies comprised of polymer B is at most $n_D=0.02$, preferably <0.015, more preferably <0.01.

DETAILED DESCRIPTION OF THE INVENTION

The matte finish of the film is produced by the bodies comprised of the thermoelastic polymer B. These bodies consist of latex particles with mean particle diameter 1–150 microns, preferably 1–10 microns, particularly preferably 1–5 microns. The matte effect is produced by these particles on the surface of the film, with, in a preferred embodiment, the particles actually projecting out from the surface,. to provide diffuse light dispersion which substantially reduces reflection of the light and thereby reduces gloss. At the same time, it is desired that the transparency of the film and thus the light transmission be as high as possible. This is achieved by closely matching the index of refraction $n_{D,A}$ of the thermoplastic matrix polymer A and the index of refraction $n_{D,B}$ of the thermoelastic polymer B, so that at maximum the difference is 0.02.

$$n_D = n_{D,A} - n_{D,B} \leq 0.02$$

If the difference exceeds 0.02, the core layer has a net clouding effect, i.e. light transmission is substantially attenuated.

The impact strength of the film is provided by the structure of the thermoplastic polymer matrix A, which is in the form of a clear polymethacrylate molding compound of high impact strength, and which does not become cloudy or colored under the action of heat and moisture; this molding compound is described in DE 38 42 796. The embedded particles (a2) of the tough phase are selected in size and size-uniformity such that the film remains transparent. It is surprising that the tough phase particles (a2) do not agglomerate when polymers A and B are intermixed, and thus that cloudiness which would occur in polymer A due to light dispersion by agglomerates does not develop.

The weather resistance of the film itself is ensured by a high amount of acrylate and/or methacrylate monomer units in polymers A and B.

In an advantageous embodiment, the film, in addition to having the above-mentioned properties, can absorb UV light, and thus provides protection for UV-sensitive substrates. This is achieved by incorporating units of polymerizable UV-absorbers and/or by intermixing low molecular weight (preferably $<2\times10^3$ Dalton) UV-absorbers, in the phases, particularly the hard phase (a1) of polymer A.

It is of particular advantage that the matte finish of the film does not degrade when the film is heated to a temperature in the thermoelastic state range and is then cooled without being acted on by a forming tool. This makes it possible for the film to be laminated onto a substrate which is to be protected, without losing its matte finish. (In lamination, the film is applied to the substrate under pressure in the gap of a pair of rolls.)

Preparation of Polymers A and B

The thermoplastic polymer A, which is preferably a two-phase material, is produced by a two-stage emulsion polymerization in water, as described in DE 3,842,796. In the first stage, the tough phase (a2) is produced, including a21) which comprises at least 50 wt. %, preferably >80 wt. %, up to 99.5 wt. %, of lower alkyl ($C_1$–$C_{10}$) acrylates, resulting in a glass transition temperature of this phase of <−10° C. The crosslinking monomers (a22) used are preferably (meth)acrylic esters of diols, e.g., ethylene glycol dimethacrylate or 1,4-butanediol dimethacrylate, aromatic compounds with 2 vinyl or allyl groups, e.g., divinylbenzene, or other crosslinking agents including preferably those having two ethylenically unsaturated, radically polymerizable groups, e.g., allyl methacrylate, as graft crosslinking agents.

Particularly advantageous examples of crosslinking agents are those with three or more unsaturated, radically polymerizable groups, such as allyl groups or (meth)acrylate groups, preferably triallyl cyanurate, 2,2-dihydroxymethyl-1-butanol triacrylate and -trimethacrylate, and pentaerythritol tetraacrylate and -tetramethacrylate. Additional examples are given in U.S. Pat. No. 4,513,118, hereby incorporated by reference.

The ethylenically unsaturated, radically polymerizable monomers (a23) may be, e.g., (meth)acrylic acid and alkyl esters of same having 1–20 C atoms, to the extent not already mentioned. The alkyl group may be linear, branched, or cyclic. The monomers (a23) may also comprise other ethylenically unsaturated, radically polymerizable aliphatic comonomers which are copolymerizable with the alkyl acrylates (a21). However, appreciable proportions of aromatic comonomers, such as styrene, α-methystyrene, or vinyl toluene are still impermissible, because they lead to undesirable properties of the molding compound A, particularly weathering properties. In producing the tough phase in the first stage, high accuracy must be observed in the control of the particle sizes and the degree of nonuniformity of the particle sizes. The particle size of the tough phase essentially depends on the concentration of the emulsifier used. Particles with mean size (weight basis) <130 nm, preferably <70 nm, and with particle size distribution nonuniformity <0.5, preferably <0.2, are achieved with emulsifier concentrations 0.15–1.0 wt. % (based on the weight of the aqueous phase). This is particularly the case for anionic emulsifiers, e.g. the particularly preferred alkoxylated and sulfated paraffins.

The nonuniformity U80 of the particle size distribution is by definition dimensionless, and is defined as follows. U80 is determined from an integral consideration (i.e. finding the area under the curve) of the particle size distribution which distribution has been determined by ultracentrifuging. Its definition is:

$$U_{80}=(r_{90}-r_{10})\div r_{50},$$

where r10 is the mean integral particle radius for which 10% of the particle radii are <r10 and 90% of the particle radii are >r10; r50 is the mean integral particle radius for which 50% of the particle radii are <r50 and 50% of the particle radii are >r50; and r90 is the mean integral particle radius for which 90% of the particle radii are <r90 and 10% of the particle radii are >r90.

The polymerization initiators used are, e.g., alkali- or ammonium peroxydisulfates, in the amount of 0.01–0.5 wt. % (based on the weight of the aqueous phase), and the polymerization is initiated at temperatures of 20–100° C. Preferred are redox systems, e.g., a combination of 0.01–0.05 wt. % organic hydroperoxide and 0.05–0.15 wt. % Rongalit® (sodium hydroxy methylsulfinate), at temperatures of 20–80° C.

The hard phase (a1), which is covalently bonded to the tough phase (a2) to the extent of 15 wt. %, has a glass transition temperature of at least 70° C. and may be comprised exclusively of methyl methacrylate. The comonomers (a12) may comprise one or more additional ethylenically unsaturated, radically polymerizable monomers, in amounts of up to 20 wt. % of the hard phase, wherein alkyl (meth) acrylates, preferably alkyl acrylates with 1–4 C atoms in the alkyl group, may be employed in amounts such that the above-mentioned requirement of glass temperature ≧70° C. is met.

The polymerization of the hard phase (a1) is carried out in a second stage, also in emulsion, with use of the customary auxiliary agents such as are used, e.g., in the polymerization of the tough phase (a2).

In a preferred embodiment, the hard phase contains low molecular weight and/or copolymerized UV.absorbers in amounts of 0.1–10 wt. %, preferably 0.5–5 wt. % (based on the weight of A) as an ingredient or part of the comonomer component (a12), in the hard phase. Examples of polymerizable UV absorbers as described in, among other places, U.S. Pat. No. 4,576,870, hereby incorporated by reference, are 2-(2"-hydroxyphenyl)-5-methacrylamidobenzotriazole and 2-hydroxy-4-methacryloxybenzophenone. Low molecular weight UV absorbers may be, e.g., derivatives of 2-hydroxybenzophenone or 2-hydroxyphenylbenzotriazole or salicylic acid phenyl ester. Particularly preferred are UV absorbers which are relatively nonvolatile at the processing temperature and are homogeneously miscible with the hard phase (a1) of the polymer A.

The bodies-comprised of polymer B are latex particles with mean particle size between 1 and 150 microns, preferably between 1 and 10 microns, and particularly preferably between 1 and 5 microns. Preferably 75–99.5% of polymer B is represented by (b1) in the form of a mixture comprised of methyl methacrylate and a lower alkyl methacrylate, preferably $C_1$–$C_6$, in a ratio (by weight) of 3:1 to 1:3; further, 0.5–10 wt. % of B is represented by a crosslinking monomer (b2) which may comprise the crosslinking agents described in connection with (a22) (see supra);

and further, 0–15 wt. % of B is represented by another monomer (b3), which may be, e.g., other esters of acrylic- and/or methacrylic acid, styrene, acrylonitrile and methacrylonitrile, vinyl acetate, and similar monomers, preferably water-insoluble.

It is advantageous if the latex particles comprised of polymer B are spherical in shape. Advantageously they are prepared by the emulsion polymerization by the so-called "seed latex" method, and are dried to a powder by spray drying under conditions such that the individual particles do not melt.

The difference between the indices of refraction of polymers A and B, $n_D = n_{D,A} - n_{D,B}$, must not exceed 0.02. If $n_D > 0.02$, mixtures of A and B display a pronounced cloudiness, whereby light transmission substantially reduced even in films with thickness ≦1 mm. The condition $n_D \leq 0.02$ is particularly well satisfied if the chemical composition of the thermoplastic hard phase (a1) corresponds to or closely resembles that of the polymer B. When the compositions of A and B differ substantially, it may be advisable to include comonomer units in the structure of A or B which units can bring the indices of refraction closer together. A precondition for this is always that the polymers A and B be thermodynamically compatible. In case of incompatibility between A and B, the extrusion results in a phase separation between A and B and thereby poor mechanical properties of films manufactured from these mixtures.

Manufacturing of the Film

Prior to the extrusion into a film, the polymer A, which is in the form of an aqueous dispersion, is processed to form a molding compound. For this purpose, the water-soluble components of the dispersion, which dispersion has solids content 30–60 wt. %, are separated out by coagulating the dispersion and separating the liquid aqueous phase from the coagulate, and the coagulate is melted to form a molding compound. Advantageously, a double-screw degassing extruder such as described in U.S. Pat. No. 4,110,843 is used for this. The melted molding compound is extruded from the extruder and granulated. Alternatively, the polymer A can be isolated as a powder from the aqueous dispersion, by spray drying.

The polymer A in the form of a granular molding compound or spray-dried powder is mechanically mixed with the spray-dried latex particles of polymer B, and the mixture is melted in a mixing extruder at 220–280° C., preferably 230–260° C., more preferably 240° C., is extruded from the extruder, and is re-granulated. The granulate comprised of the thermoplastic polymer A with inclusions of dimensionally stabile latex particles of the thermoelastic polymer B is melted in an extruder at 220–280° C., preferably 240° C., is extruded through a slit-nozzle with exit gap 0.1–2 mm, and can be processed to yield a film 0.1–1 mm thick by rolling on a film rolling apparatus-with roll temperatures 50–100° C. The roll surfaces on the film rolling apparatus can be smooth and highly glossy, as is customary; the result nonetheless is a highly transparent film with a matte finish. The preferred method of manufacturing the film is in a chill roll apparatus, wherein only one surface of the molten sheet comes into contact with the roll which has been cooled to 20–110° C. In this process, the surface of the melt is not pressed by an opposing roll; accordingly, the spherical segments of the embedded particles B which segments protrude from the surface of the melt are not pressed back into the matrix of polymer A. Despite the fact that the surface of the chill roll is polished to a high gloss, the roughness values R on both surfaces of the solidified sheet, measured according to DIN 4768, are approximately equal; depending on the diameter of the particles B, the values $R_a$ may be between 0.01 and 50 micron, $R_z$ may be between 0.08 and 100 micron, and $R_{max}$ may be between 0.1 and 150 micron. This method may be used to produce films in the range of thickness 0.02–0.5 mm, preferably 0.05–0.2 mm. Preferably the diameter of polymer B particles does not exceed ⅕ of the film thickness.

The above-described method of manufacturing the film comprises three stages:

1) Manufacture of the granulate comprised of polymer A;
2) Manufacture of the granulate comprised of polymer A with embedded particles of polymer B; and
3) Extrusion of the film.

According to alternative embodiments, a two-step method may be employed. Here stages (2) and (3) of the above-described method are combined, with the film extruder serving, at the same time, as a mixing extruder for mixing the polymers A and B.

Properties of the Film

A film produced by the described method is weather resistant, has low incidence of white fracture when buckled or folded, has impact strength which does not degrade upon cooling or heating, and is not (appreciably) subject to yellowing after the described thermoplastic processing steps. The surface of the film has a matte finish, and at the same time the film is highly transparent. In a particularly preferred embodiment, the film contains UV-absorbing substances, preferably incorporated in the hard phase (a1) of the thermoplastic polymer A. This confers UV-filtering properties on the film, rendering it an effective protector of substrates which are unstable under UV irradiation, e.g., which undergo discoloration, or degradation of mechanical properties, after a certain time of exposure.

If necessary the film is applied to the substrate by roll-lamination, at temperatures of 90–160° C., in the plastic state (of polymer A), under pressure, in the gap of a roll pair wherewith the temperatures on the surfaces of the rolls are 80–140° C. In the case of a substrate which has a complex surface geometry and thus is not a candidate for the described roll-lamination process, a pressing or deep drawing method may be used. In all cases, the treated films retain their matte finish.

The film can also be bonded to the substrate with a reactive-, solvent-mediated-, or hot adhesive.

Examples of substrates are:

Sheets, corrugated sheets, double skin sheets, and other profiles comprised of weather-labile plastic materials such as PVC, polyester, or polycarbonate;

Wood or paper;

Steel sheets or aluminum sheets, e.g., garage doors, vehicles, containers, and traffic signs; and Protective coverings for pictures.

(This list is not exhaustive.) The matte finish of the film has excellent anti-glare properties.

EXAMPLES

Having generally described this invention, a further understanding can be obtained by reference to certain specific examples which are provided herein for purposes of illustration only and are not intended to be limiting unless otherwise specified.

Example 1

Manufacturing of Polymer A

A 60% emulsion I was prepared comprised of the following:

99 pbw (parts by weight) butyl acrylate;

1 pbw triallyl cyanurate; and 0.12 pbw tert-butylhydroperoxide; in 67 pbw of a 0.15% aqueous solution of sodium lauryl sulfate.

A 50% emulsion II was prepared comprised of the following:

89.35 pbw methyl methacrylate;

7.75 pbw butyl acrylate;

2.9 pbw 2-(2'-hydroxyphenyl)-5-methacrylamidobenzotriazole;

0.775 pbw dodecyl mercaptan;

0.15 pbw octadecyl-3-(3,5-di-tert-butyl-4-hydroxyphenyl)-propanoate; and 0.1 pbw tert-butylhydroperoxide; in 100.0 pbw of a 0.06% aqueous solution of sodium lauryl sulfate.

A polymerization vessel with a stirrer, external cooling, and a feed vessel was provided with 60 pbw of a water phase precharge comprising 1 wt. % sodium lauryl sulfate, 0.15 wt. % Rongalit® (sodium hydroxylmethyl sulfinate), 0.02 wt. % acetic acid, and 0.008 wt. % iron(II) sulfate. 50 pbw of emulsion I was added portionwise over a period of 2 hr with stirring, at 55° C. The resulting tough-phase polymer had glass transition temperature −35° C. Then 140 pbw emulsion II was added portionwise over an additional 2 hr period, wherewith the hard-phase polymer with glass transition temperature 90° C. was formed. By measurements of solubility of a coagulated polymer sample it was determined that 25 wt. % of the hard phase was bound to the tough phase.

A tightly meshing counter-flow double-screw extruder with screw-diameter D=30 mm was used to recover the solid from the dispersion which was produced. The dispersion was coagulated by the simultaneous action of heat and shear stress. The extrudate comprised of polymer A was cooled, and was granulated after it solidified. The structure of the extruder is described in detail in DE 38 42 796. The index of refraction of polymer A, measured according to DIN 53 491, was $n_{D,A}$=1.492.

Example 2

Manufacturing of Polymer B 1,200 pbw completely deionized water was charged to a polymerization vessel with a stirrer, external cooling, and a feed vessel, and was heated to 80° C. Then 6 pbw ammonium peroxydisulfate and 5 pbw of a mixture M comprised of 47.5 wt. % of methyl methacrylate, 47.5 wt. % of isobutyl methacrylate, and 5 wt. % of ethylene glycol dimethacrylate were added. After 5 min, an additional 295 pbw mixture M was added dropwise over a period of 1 hr, followed by cooling and filtration through a VA filter cloth. The resulting dispersion I was free of coagulate and had solids content 20 wt. %. The mean particle diameter was c. 0.65 micron. In a second stage, 280 pbw completely deionized water and 5.5 pbw of the above-described dispersion I were charged to a polymerization vessel, and the mixture was heated to 80° C. Then 0.18 pbw ammonium peroxydisulfate and an emulsion comprised of 215 pbw methyl methacrylate, 215 pbw isobutyl methacrylate, 23 pbw ethylene glycol dimethacrylate, 800 pbw completely deionized water, 0.68 pbw sodium lauryl sulfate, and 1.6 pbw ammonium peroxydisulfate was added dropwise over a period of 4 hr. Final polymerization was carried out at 80° C. for 1 hr following this addition, followed by addition of 0.45 pbw ammonium peroxydisulfate, and then another 1 hr polymerization. The resulting dispersion was free of coagulate and had solids content 30 wt. %. The pulverulent polymer B was recovered by spray drying. The mean particle diameter of the latex particles (which can loosely aggregate completely or partially into larger particles) was c. 3.0 micron. The index of refraction of polymer B was calculated as $n_D^{20}=1.485$ from the contributions of the polymer components, according to Brandrup and Immergut, "Polymer Handbook", 3rd Ed., pub. Wiley Interscience, Chap. VI, p. 451.

Example 3
Manufacturing of the Mixture of Polymers A and B 4 pbw of granular polymer A according to Example 1 and 1 pbw of the pulverulent polymer B according to Example 2 were mixed with the aid of a double-screw extruder and extruded through a granulation nozzle. The extrudate was divided to form granulate in a subsequent granulator.

Example 4
Manufacturing of the Film

The granulate manufactured according to Example 3 was re-plasticized in a single-screw extruder, and was extruded through a broad-slit die at 240° C., to form a thin molten film. Immediately after leaving the die, the film was taken up on the chill roll maintained at 90° C. The roll withdrew the melt from the die and cooled it below its glass temperature. The solidified film was fed to a film take-up roll via subsequent rotating rolls.

Example 5
Characteristics of the Film

The film manufactured according to Example 4 had light transmission >87% at a thickness of 80 micron (DIN 5033 and 5036, type of light D 65/10).

Since the melt was not passed through a calendar after leaving the die, the surface roughness on both surfaces of the film was approximately the same. Roughness values $R_a=0.3$ micron, $R_z=1.7$ micron, and $R_{max}=2.2$ micron were measured according to DIN 4768.

Optical characterization of the surface gave the following reflectometer values according to DIN 5033 and 5036: Angle of incidence at 20°=3–3.5; at 60°=18–20, and at 85°=55–69.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A polymethacrylate film having a matte finish, and comprised of:
   (A) a thermoplastic polymer matrix A, in the amount of 30–99.9 wt. %, comprised of:
      a1) 10–95 wt. % of a coherent hard phase with a glass transition temperature >70° C., comprised of:
         a11) 80–100 wt. % (of a1) of methyl methacrylate; and
         a12) 0–20 wt. % of one or more other ethylenically unsaturated, radically polymerizable monomers; and
      a2) 5–90 wt. % of a tough phase distributed in the hard phase and having a glass transition temperature <−10° C. and a mean particle size of less than 130 nm, comprised of:
         a21) 50–99.5 wt. % (of a2) of an alkyl acrylate wherein the alkyl group has 1–10 C atoms;
         a22) 0.5–6 wt. % of a crosslinking monomer and/or graft crosslinking agent having 2 or more ethylenically unsaturated, radically polymerizable groups; and
         a23) optionally one or more of other ethylenically unsaturated, radically polymerizable monomer;
   whereby at least 15 wt. % of the hard phase (a1) is covalently linked with the tough phase (a2);
   wherein, in order to produce the matte-finish effect, the film is further comprised of:
   (B) bodies comprised of thermoelastic polymer B, in the amount of 0.1–70 wt. %, heterogeneously distributed in the thermoplastic matrix polymer A, wherein the polymer B has a mean particle size of 1 to 150 microns and is comprised of:
      b1) 50–99.5 wt. % (of B) of an alkyl methacrylate wherein the alkyl group has 1–6 C atoms;
      b2) 0.5–10 wt. % of a crosslinking monomer having 2 or more ethylenically unsaturated, radically polymerizing groups; and
      b3) optionally other ethylenically unsaturated, radically polymerizable monomers;
   and in that the difference between the index of refraction $n_{D,A}$ of the thermoplastic matrix polymer A and the index of refraction $n_{D,B}$ of the heterogeneously distributed bodies comprised of polymer B is at most $n_D=0.02$.

2. A polymethacrylate film according to claim 1, wherein the component (a22) of the polymer A is comprised in the amount of 0.5–5 wt. % (of (a2)) of a graft crosslinking agent.

3. A polymethacrylate film according to claim 1, wherein the hard phase (a1) of polymer A is comprised in the amount of 0.1–10 wt. % (of a1) of a UV-absorber.

4. A polymethacrylate film according to claim 1, wherein the hard phase (a1) of polymer A is comprised in the amount of 0.1–10 wt. % (of a1) of a polymer-bound UV-absorber.

5. A polymethacrylate film according to claim 1, wherein the film has thickness 0.01–1 mm; and wherein the heterogeneously distributed bodies comprised of polymer B have a diameter of 1–150 microns, with the restriction that said diameter does not exceed ⅕ of the film thickness.

6. A polymethacrylate film according to claim 5, wherein a chill roll is employed in the film extrusion, said chill roll having a high-gloss polished surface.

7. A method of coating an article with the polymethacrylate film of claim 1, wherein the film is fixedly bonded to the article by at least one of roll-lamination, and adhesive bonding.

8. A method of coating an article according to claim 7, characterized in that the article is comprised of a weather-sensitive material.

9. A method of coating an article according to claim 7, characterized in that the article is comprised of a plastic.

10. A method of making a matte finish film comprising 30–99.9 wt. % of thermoplastic polymer matrix A and 0.1–70 wt. % of bodies of thermoelastic polymer B comprising:

making polymer A and B of claim 1 by emulsion polymerization;

mixing polymer A with polymer B;

melting the mixture in a mixing extruder at 220–280° C.;

extruding the mixture.

11. A method according to claim 10 wherein a chill roll is employed in the film extrusion, such that dimensionally stabile bodies of polymer B protrude from the surface of the film.

12. A method according to claim 11 wherein the bodies of polymer B have a mean particle size of between 1 and 150 microns.

13. A method according to claim 12 wherein the diameter of the particles of polymer B does not exceed 1/3 of the film thickness.

14. A polymethacrylate film according to claim 1, wherein the component (a22) of the polymer A is comprised in the amount of 0.5–5 wt. % (of (a2)) of a crosslinking monomer.

15. A polymethacrylate film according to claim 2, wherein the graft crosslinking agent is present in the amount of 0.5 to 1.5 %.

16. A polymethylacrylate film according to claim 1, comprising 75–85% of the thermoplastic polymer matrix A and 15–25% of the bodies comprised of thermoelastic polymer B.

17. A polymethacrylate film according to claim 1, wherein thermoplastic polymer matrix A comprises 70–80% of a1 and 20–30% of a2 and wherein thermoelastic polymer B comprises 90–98% alkyl methacrylates.

18. A polymethacrylate according to claim 1, wherein the hard phase contains UV-absorbers in the amount of 0.5–5 wt. %, based on the weight of polymer matrix A.

19. A polymethacrylate film having a matte finish, and comprised of:

(A) a thermoplastic polymer matrix A, in the amount of 30–99.9 wt. %, comprised of:

a1) 10–95 wt. % of a coherent hard phase with a glass transition temperature >70° C., comprised of:

a11) 80–100 wt. % (of a1) of methyl methacrylate; and a12) 0–20 wt. % of one or more other ethylenically unsaturated, radically polymerizable monomers; and a2) 5–90 wt. % of a tough phase distributed in the hard phase having a glass transition temperature <−10° C., comprised of:

a21) 50–99.5 wt. % (of a2) of an alkyl acrylate wherein the alkyl group has 1–10 C atoms;

a22) 0.5–6 wt. % of a crosslinking monomer and/or graft crosslinking agent having 2 or more ethylenically unsaturated, radically polymerizable groups; and a23) optionally one or more of other ethylenically unsaturated, radically polymerizable monomer;

whereby at least 15 wt. % of the hard phase (a1) is covalently linked with the tough phase (a2);

wherein, in order to produce the matte-finish effect, the film is further comprised of:

(B) bodies comprised of thermoelastic polymer B, in the amount of 0.1–70 wt. %, heterogeneously distributed in the thermoplastic matrix polymer A, wherein the polymer B is comprised of:

b1) 75–99.5 wt. % (of B) of a mixture comprising methyl methacrylate and a different alkyl methacrylate wherein the alkyl group has 2–6 C atoms in a weight ratio of 3:1 to 1:3;

b2) 0.5–10 wt. % of a crosslinking monomer having 2 or more ethylenically unsaturated, radically polymerizing groups; and b3) optionally other ethylenically unsaturated, radically polymerizable monomers;

and in that the difference between the index of refraction $n_{D,A}$ of the thermoplastic matrix polymer A and the index of refraction $n_{D,B}$ of the heterogeneously distributed bodies comprised of polymer B is at most $n_D$=0.02.

20. A polymethacrylate film according to claim 1, wherein b1) comprises 75–99.5 wt. % (of B) of a mixture comprising methyl methacrylate and a different alkyl methacrylate wherein the alkyl group has 2–6 C atoms in a weight ratio of 3:1 to 1:3.

21. A polymethacrylate film according to claim 19, wherein b1) comprises a mixture of methyl methacrylate and isobutyl methacrylate.

22. A polymethacrylate film according to claim 21, wherein b2) comprises ethylene glycol dimethacrylate.

* * * * *